(12) United States Patent
Komush

(10) Patent No.: US 6,321,532 B1
(45) Date of Patent: Nov. 27, 2001

(54) MULTIPLE TRACT EXHAUST MANIFOLD/HEADER

(76) Inventor: Dwayne D. Komush, 158 Turquoise Way, Livermore, CA (US) 94550

( * ) Notice: Subject to any disclaimer, the term of this patent is extended or adjusted under 35 U.S.C. 154(b) by 0 days.

(21) Appl. No.: 09/518,750

(22) Filed: Mar. 3, 2000

(51) Int. Cl.$^7$ .................................................. F02B 27/02
(52) U.S. Cl. ............................... 60/313; 60/323; 60/324; 60/312
(58) Field of Search ............................ 60/312, 313, 323, 60/324

(56) References Cited

U.S. PATENT DOCUMENTS

| | | | |
|---|---|---|---|
| 4,813,232 | * 3/1989 | Hitomi et al. | 60/313 |
| 4,866,931 | * 9/1989 | Hansen | 60/313 |
| 5,072,583 | 12/1991 | Urushihara et al. | 60/313 |
| 5,594,217 | 1/1997 | LeQuire | 181/235 |
| 5,729,973 | 3/1998 | Zander et al. | 60/302 |
| 5,806,311 | * 9/1998 | Okamoto | 60/323 |
| 5,809,778 | * 9/1998 | Nording | 60/313 |
| 6,003,301 | 12/1999 | Bratkovich et al. | 60/204 |

FOREIGN PATENT DOCUMENTS

| | | | |
|---|---|---|---|
| 0307898 | * 3/1989 | (EP) | 60/313 |
| 403151514 | * 6/1991 | (JP) . | |
| 401208516 | * 8/1989 | (JP) | 60/313 |

OTHER PUBLICATIONS

Probst, Charles O.; "Ford Fuel Injection & Electronic Engine Control"; R. Bentlely Publishers, Cambridge, MA., 1996.

Van Valkenburg, Paul; "Race Car Engineering and Mechanics"; Dodd, Mead & Company, New York, NY., 1995.

Heywood, John B.; "Internal Combustion Engine Fundamentals"; McGraw–Hill Book Company, New York, NY., 1988.

Taylor, Charles F.; "The Internal Combustion Engine in Theory and Practice"; MIT Press, Cambridge, MA., 1976.

Springer, George S. and Patterson, Donald J.; "Engine Emissions, Pollution Formation and Measurement"; Plenum Press, New York, NY., 1973.

* cited by examiner

Primary Examiner—Thomas Denion
Assistant Examiner—Diem Tran
(74) Attorney, Agent, or Firm—Johney U. Han

(57) ABSTRACT

An exhaust system which unexpectedly increases engine performance significantly contains multiple tracts for exhaust gases to travel within upon exiting an internal combustion engine. The multiple tracts can be made of individual tubes or contained in a single manifold device. The multiple tracts are comprised of a plurality of primary tracts which are connected in flow communication to the internal combustion engine. As exhaust gases are expelled from the engine, the gases travel down the primary tracts into several secondary exhaust tracts which branch from each of the primary tracts downstream of the engine. Both the primary and secondary tracts can be of generally any tubular cross-section. Additionally, the secondary exhaust tracts can range in virtually any number of tracts and geometric configuration and is limited only by space considerations. The multiple tract exhaust apparatus can be used on all types of internal combustion engines, regardless of combustion type or combustion chamber type including gasoline, alcohol, diesel, or gasoline/alcohol.

17 Claims, 7 Drawing Sheets

MULTIPLE TRACT EXHAUST MANIFOLD/HEADER

BACKGROUND

1. Field of the Invention

This invention relates to an exhaust manifold/header as used in engines in motorized vehicles, for example, aircraft, automobiles, and stationary power plants.

2. Description of Related Art

Conventional internal combustion engines use a manifold or header apparatus with a single tract, each tract attached to each exhaust ports to collect exhaust gases from the individual ports. These exhaust gases result from the conventional combustion processes which occur in internal combustion engines. The exhaust manifold/header assists in improving engine output or efficiency by the following process. As the exhaust gases leave a combustion chamber within the engine cylinder head, these exiting gases create a slight vacuum or scavenging.

The scavenging assists in removing the remaining exhaust gases and helps to bring in additional intake charge. This exhaust process assists the intake charging process because an intake valve begins to open while an exhaust valve is still open. When the intake and exhaust valves are opened simultaneously, this event is termed overlap. Because of overlap, the exhaust process assists in the intake charging process. Design of valve overlap uses the exhaust system design features as a design parameter. The dimensional features of the exhaust tract greatly influence the degree to which intake charging is assisted by the exhaust gases. Thus current manifold or header design technology can use only the dimensional properties of the single tract.

The next effect the exhaust tract is required to complete is to create a negative pressure behind the closed exhaust valve. The purpose of the negative pressure at the exhaust valve is to assist the next cycle of extracting the combustion products. As the exhaust valve opens, the vacuum created by the previous exhaust gas flow process aids the exhaust gas flow into the exhaust tract. Therefore, the dimensional features of the exhaust tract greatly influence the degree of exhaust gas extraction.

Various multiple exhaust systems have been conventionally used. For example, U.S. Pat. No. 5,072,583 (Urushihara et al.) discloses the use of an exhaust system for internal combustion engines utilizing multiple exhaust passages. These exhaust passages are used to allow for higher engine torque. Also in U.S. Pat. No. 5,729,973 (Zander et al.), an exhaust collector with multiple tubes for reducing heat losses in the exhaust system is disclosed. However, both these examples, as well as many others currently in the art, utilize the use of exhaust ports in fluid communication through singular exhaust tracts converging into a singular common exhaust tract.

The conventional single exhaust tract has only a single set of operating capabilities, which are limited by the physical dimensions of the single tract. The single operating capabilities include single exhaust gas speed, exhaust flow rate, backpressure, cylinder scavenging rate, exhaust temperature profile and sonic velocity. Therefore, there is a need for exhaust tracts having multiple operating capabilities which would increase engine performance.

SUMMARY

The present invention adds additional parallel exhaust paths for each individual exhaust port to remove the exhaust gases. The multiple exhaust tracts add multiple operating capabilities. The individual tract in a cluster can then have specific dimensional properties. As an example, one tract can have high-flow low-backpressure, the second tract can have high-backpressure low-flow properties, and a third could have intermediate properties. The number of tracts or paths and the dimensional features can be varied. The variation is a function of the desired engine operating results. The multiple paths increase the design variation possible and is not limited to the exhaust processes of the fixed properties of a single tract exhaust system.

This invention uses at least two or more exhaust tracts to draw the exhaust gases away from each of the engine combustion chamber exhaust ports. The multiple exhaust tracts create multiple scavenging regimes, which are created by the exhaust gases leaving the exhaust port, and thereby improve engine performance. Thus there are multiple exhaust gas speeds, exhaust flow rates, backpressures, cylinder scavenging rates, exhaust temperature profiles and sonic velocities which a designer may use to improve an engine's performance.

BRIEF DESCRIPTION OF THE DRAWINGS

Use of the same reference symbols in different figures indicates similar or identical items.

DETAILED DESCRIPTION

Figure 1:
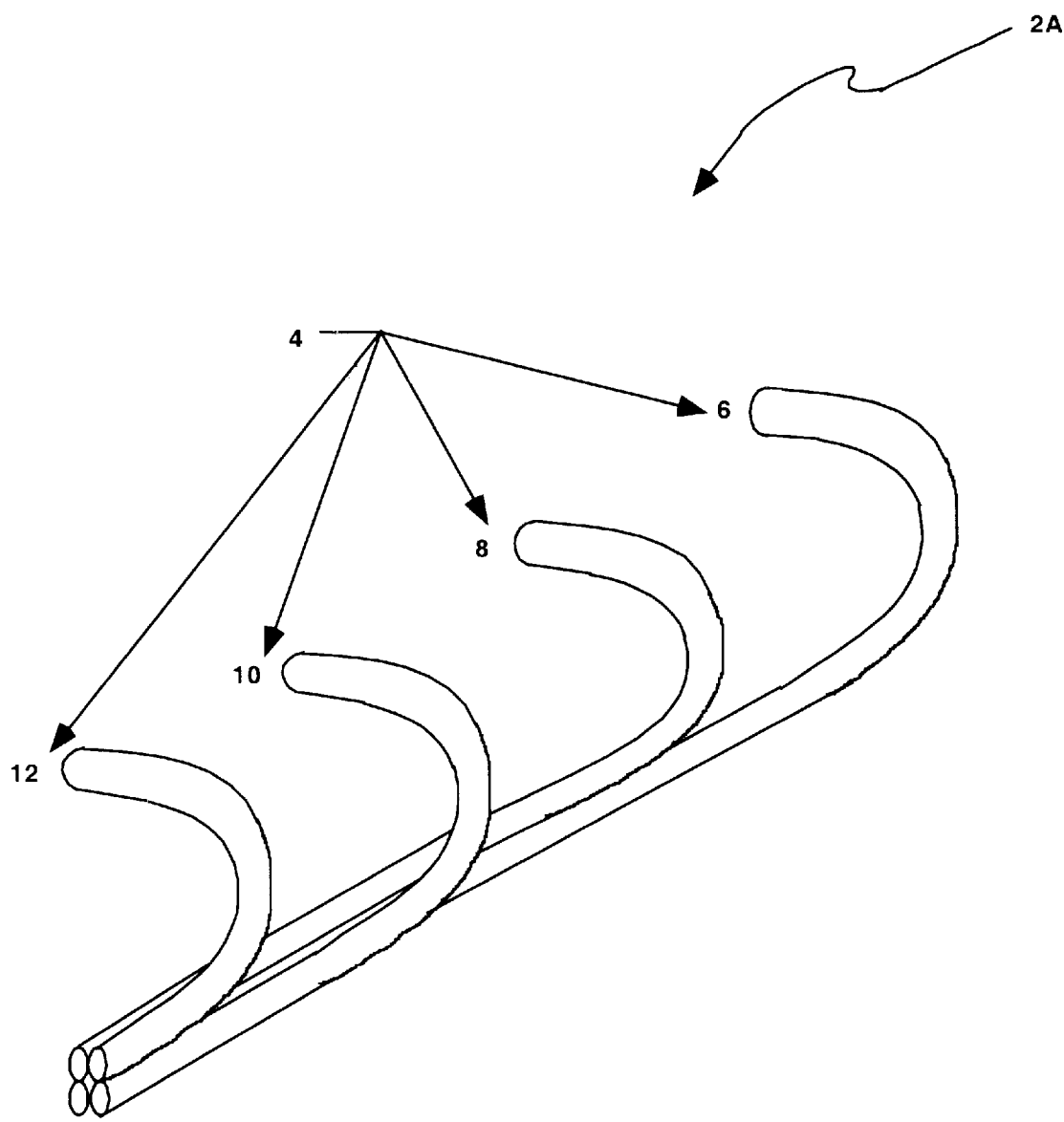
FIG. 1 shows an isometric view of the current technology embodiment having 4-exhaust port single tract exhaust manifold attached to a 4-cylinder engine.
Figure 2:
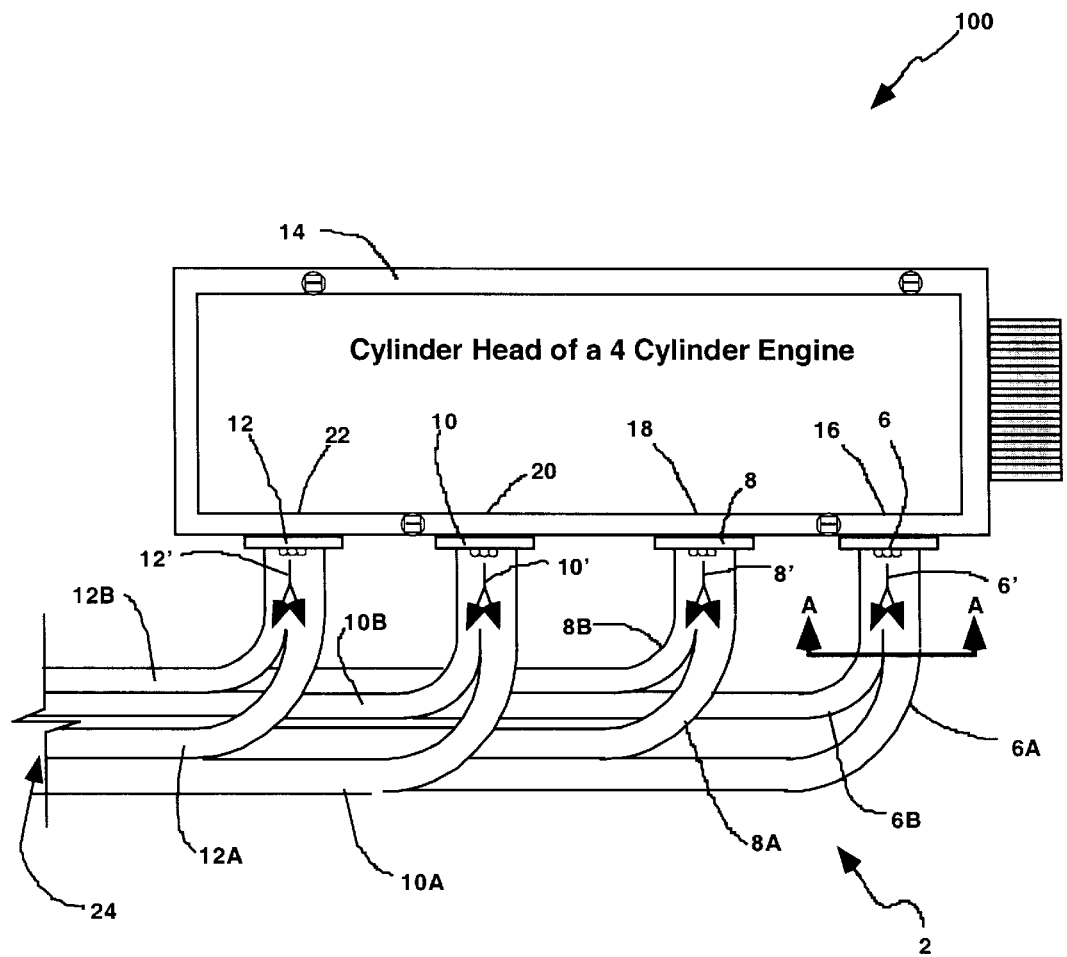
FIG. 2 shows a top view of one embodiment having 4-exhaust port dual tract exhaust manifold attached to a 4-cylinder engine.

The engine exhaust ports 16, 18, 20 and 22 are shown in FIG. 2, in one embodiment, as combination 100, with 4-cylinder internal combustion engine 14. In this embodiment, exhaust manifold 2 with individual ports 6, 8, 10, 12 is shown with four exhaust ports each with a two, or dual, tract exhaust manifold; however, it is within the scope of this invention in other embodiments for use with engines with numerous exhaust ports numbering greater than or less than four. This is compared to the conventionally available exhaust technology as represented in FIG. 1. An isometric view is shown in FIG. 1 of a conventional exhaust manifold 2A. As seen, ports 6, 8, 10, 12 consist of only a single exhaust tube throughout their entire length.

As illustrated back in FIG. 2, during operation, as exhaust gases produced from combustion processes within engine 14 exit through the primary exhaust port 6, the gases enter multiple tract manifold 2 through the secondary individual tracts 6A, 6B which branch from exhaust port 6. The gas movement through exhaust ports 6, 8, 10, 12 is indicated by arrows 6', 8', 10', 12', Exhaust gases then travel down each individual, or secondary, tract 6A, 6B. Likewise, exhaust gases at exhaust port 8 travel into the individual dual-path manifold 8A, 8B and again for exhaust gases traveling through remaining exhaust ports 10, 12 and through their respective multiple tract manifolds 10A, 10B, 12A, 12B.

Individual multiple tract manifolds 6B, 8B, 10B, 12B are considered high-backpressure low-flow (HBLF) tracts; whereas multiple tract manifolds 6A, 8A, 10A, 12A are considered low-backpressure high-flow (LBHF) tracts. HBLF tracts 6B, 8B, 10B, 12B are generally smaller in diameter than LBHF tracts 6A, 8A, 10A, 12A but are also generally longer in length. This differentiation creates a negative pressure at valve seats 16, 18, 20, 22 due to exhaust pulses exiting exhaust manifold 2 at exhaust exit 24. When an intake valve within engine 14 opens (intake valve is not shown), the negative pressure created by exiting gases helps to drag in more intake air. The diameters and lengths of each individual tract in manifold 2 is limited only by the dimensions of exhaust ports 4 and the space limitations of the engine compartments in which engine 14 would be located.

Exhaust manifold 2 can be made of any number of materials, e.g., steel, cast iron conventionally used in exhaust systems. Manifold 2 can also be fabricated with any number of conventionally known methods currently used, e.g., tubing benders and weldments or castings. However, the scope of this invention is not limited by the material type or the method of fabrication.

Figure 3:
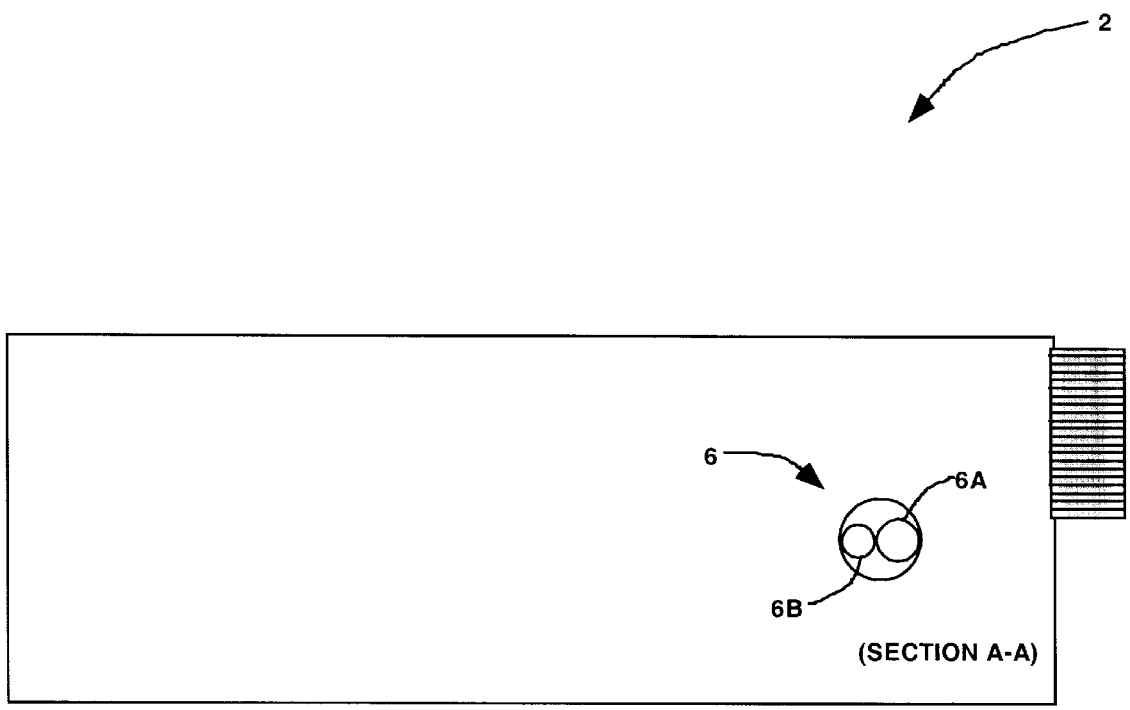
FIG. 3 shows a cross-sectional view taken from FIG. 2 of a single multiple tract exhaust port.

FIG. 3 shows cross-section A—A taken from FIG. 2 of an individual multiple-tract exhaust port 6. As shown, LBHF tract 6A has a diameter which is relatively larger than HBLF tract 6B. The LBHF tracts can generally be located in any placement relative to the HBLF tracts as long as the diameter and length parameters are considered. Additionally, the cross-sectional areas of both multiple-tract exhaust port 6 and the secondary LBHF and HBLF exhaust ports may vary from circular, elliptical, rectangular, or any generally tubular cross-section.

Figure 4:
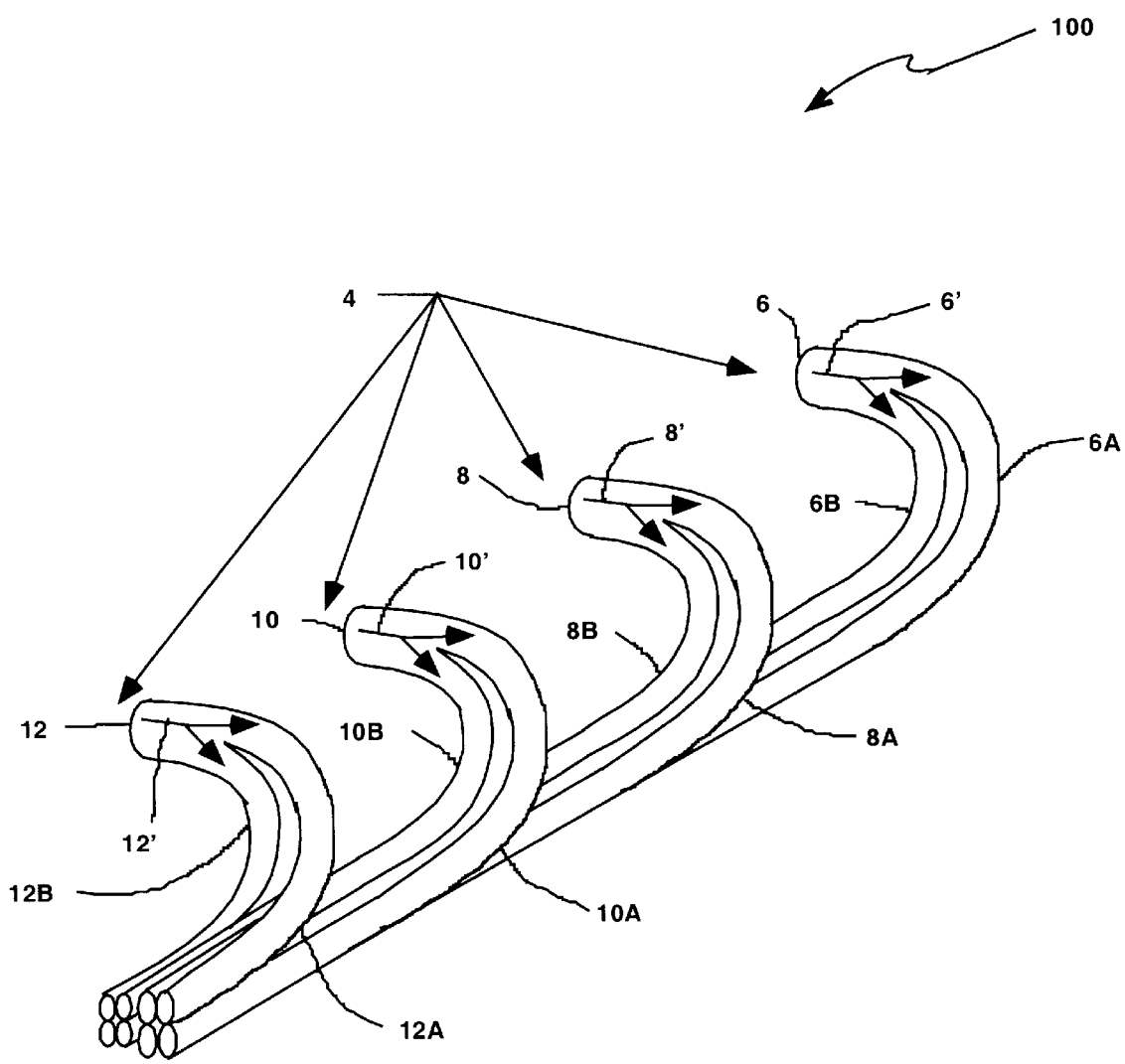
FIG. 4 shows an isometric view of the embodiment from FIG. 2.

FIG. 4 shows an isometric view of one embodiment of the present invention taken from FIG. 2. This embodiment shows individual tracts 6A to 12B in a linear arrangement relative to each other; however, alternative embodiments are possible in arranging individual tract geometry relative to each other. Such alternative embodiments are within the scope of this invention and are limited only by space considerations within an engine compartment. Multiple tracts 6A to 12B can be incorporated into a single-manifold device or each tube can retain its own individual geometry throughout. In either case tracts 6A to 12B will eventually collect into a collector (collector not shown) which would then flow to engine exhaust 24.

Figure 5:
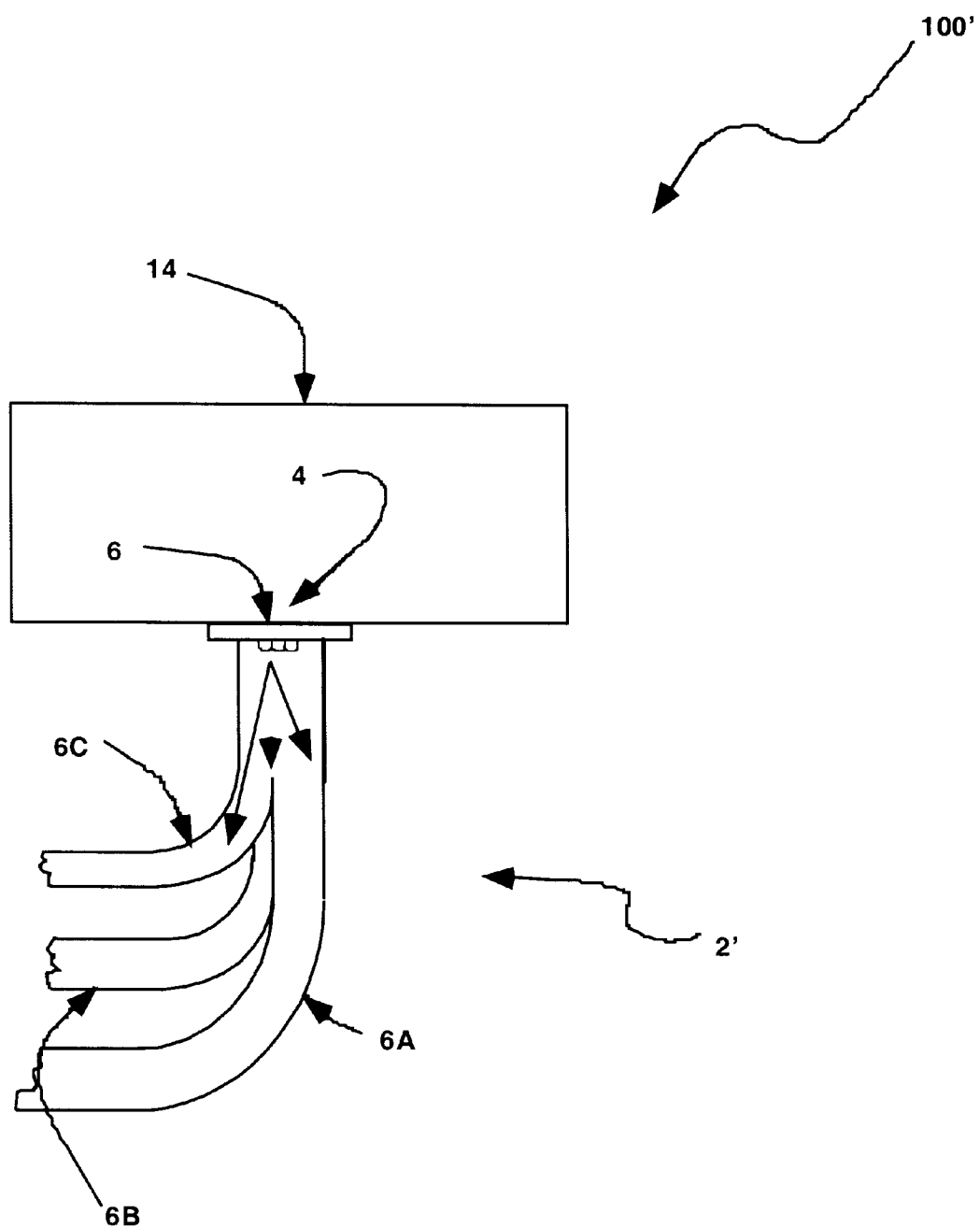
FIG. 5 shows a top view of an alternative embodiment having a three-tract exhaust manifold attached to a single cylinder engine.

FIG. 5 shows a top view of an alternative embodiment in exhaust manifold 2' having a three-tract manifold with individual tracts 6A, 6B, 6C. Exhaust manifold 2' is connected in combination 100' to engine 14. This embodiment operates in the same manner as that described above for manifold 2 in FIG. 2 with similar operating conditions and limitations. The present invention captures the multiple-exhaust tract concepts and it is within the scope of this invention to include any number of multiple-exhaust tracts which can be used on any type of internal combustion engine including any type of fuel and combustion chamber or combustion chamber arrangements including, but not limited to, gasoline, alcohol, diesel, or gasoline/alcohol combustion.

Figure 6:
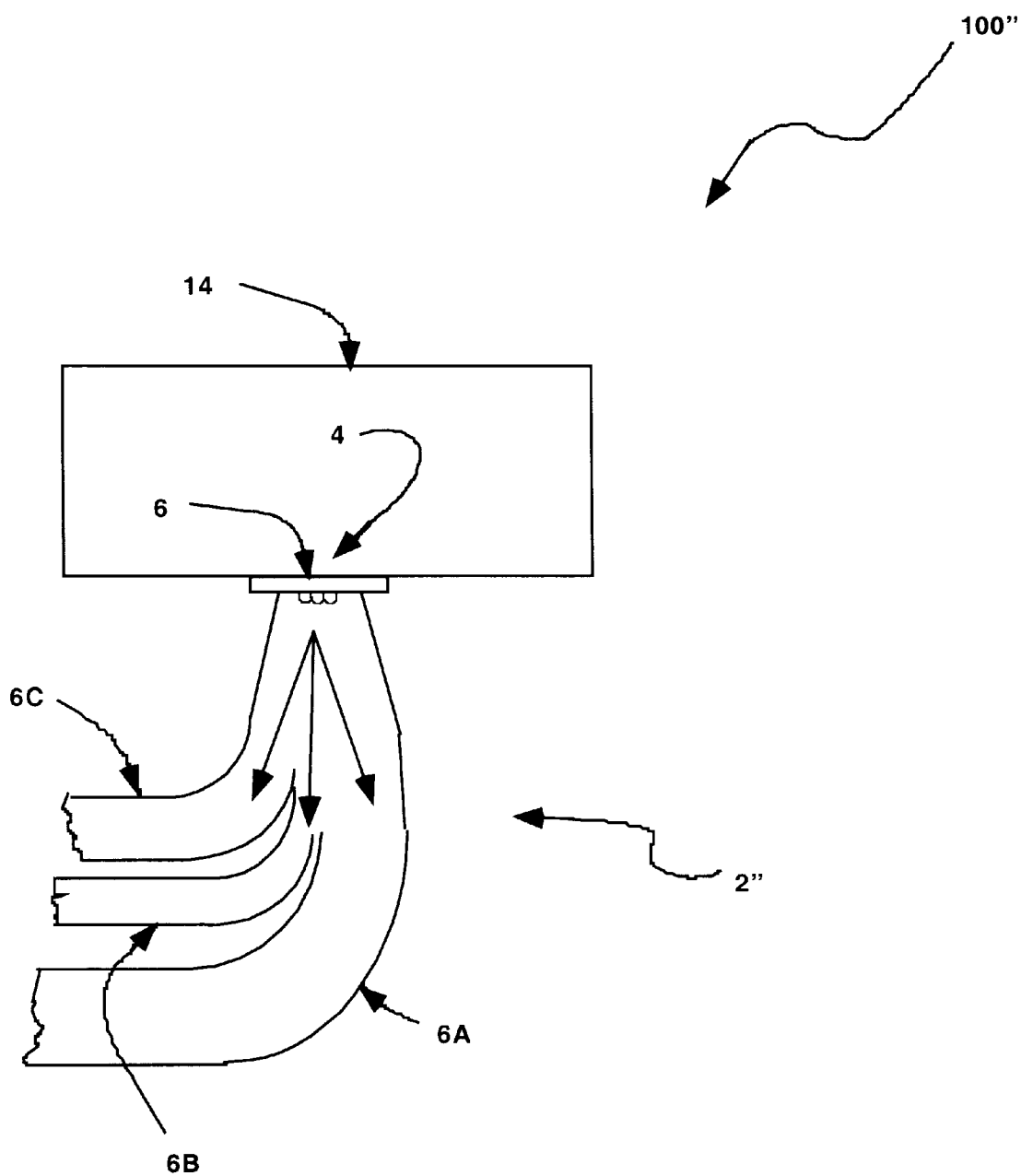
FIG. 6 shows a top view of an alternative embodiment having a three tract exhaust manifold where the tract tubes are larger than the exhaust port.

FIG. 6 is an embodiment where the combined cross-sectional area of triple tube manifold 2", is larger than the engine exhaust port 6. The relative spatial relationship of the three tubes can vary, depending upon the physical proportions of the applications. It is the within the scope of this invention to capture any number of multiple exhaust tracts with varying cross-sectional areas for each of the individual exhaust tracts.

Figure 7:
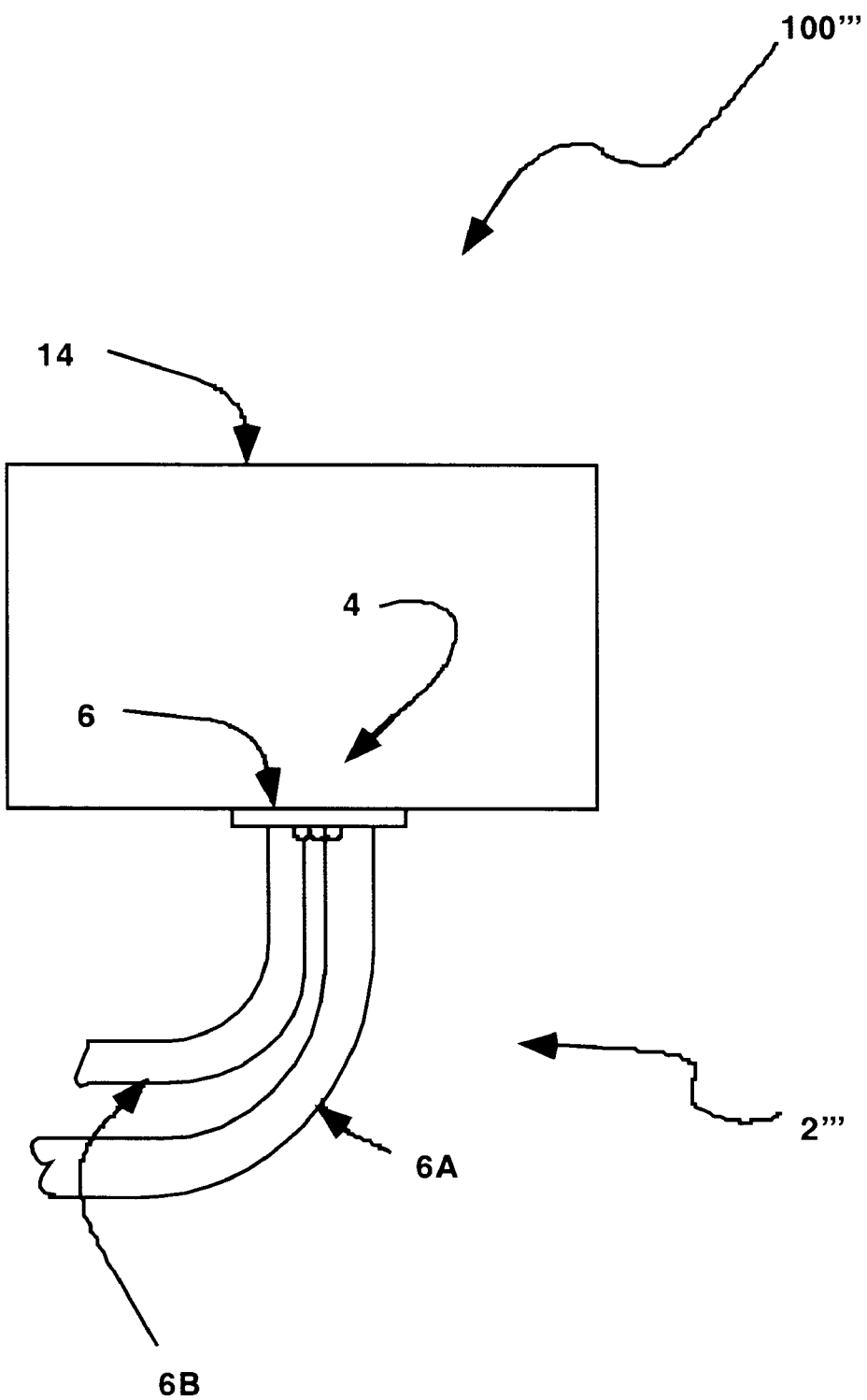
FIG. 7 shows a top view of another alternative embodiment having a dual tract exhaust manifold terminating directly at the exhaust port.

FIG. 7 shows a top view of an alternate embodiment in exhaust manifold 2''' having a two-tract manifold with individual tracts 6A and 6B. Exhaust manifold is connected in combination 100''' to engine 14. This present embodiment captures the multiple-exhaust tracts where the individual tracts 6A and 6B terminate at the engine exhaust port 4. It is within the scope of this invention to capture any combination of exhaust tract termination(s) at the exhaust port.

The total cross-sectional area, diameter or alignment of the collection of tubes has no relationship to the cross-sectional area, diameter or alignment of the exhaust port.

This invention improves the performance of any internal combustion engine, regardless of the engine combustion chamber type. The multiple exhaust tracts improve the engine performance by increasing the speed range applicability of the exhaust manifold. The dimensional features of the exhaust tracts can be varied or fine-tuned to achieve the desired capabilities. The multiple tracts allow a significant range of exhaust tuning not capable with the current single tract exhaust systems.

Although the invention has been described with reference to particular embodiments, the description is only an example of the invention's application and should not be taken as a limitation. In particular, even though much of the preceding discussion was aimed at internal combustion engines and 2- and 3-tract manifold exhausts, alternative embodiments of this invention include different types of engines which may require an exhaust system as well as multiple-tract manifolds numbering greater than three individual tracts. Various other adaptations and combinations of features of the embodiments disclosed are within the scope of the invention as defined by the following claims.

I claim:

1. An exhaust manifold apparatus, comprising a plurality of exhaust tracts, each of said exhaust tracts connected in flow communication to a corresponding exhaust port and further dividing into a plurality of secondary exhaust tracts, each of said secondary exhaust tracts being configured independently of an engine firing order, wherein each of said secondary exhaust tracts comprises at least one low-backpressure high-flow tract and at least one high-backpressure low-flow tract.

2. The exhaust manifold of claim 1, wherein a cross-section of each of said secondary exhaust tracts is generally tubular.

3. A method of increasing the efficiency of an internal combustion engine, comprising:

providing an exhaust manifold apparatus, said exhaust manifold comprising at least one primary exhaust tract;

passing exhaust gases through said primary exhaust tract; and dividing said exhaust gases through a plurality of secondary tracts branching from said primary exhaust tract, each of said secondary tracts being configured independently of a firing order of said engine, wherein each of said secondary exhaust tracts further comprises at least one low-backpressure high-flow tract and at least one high-backpressure low-flow tract.

4. The method of claim 3, wherein each of said primary exhaust tracts comprise at least two secondary exhaust tracts.

5. The method of claim 3, wherein said exhaust manifold comprises a plurality of primary exhaust tracts.

6. An exhaust manifold apparatus, comprising at least one primary exhaust tract, said primary exhaust tract further comprising a plurality of secondary exhaust tracts, each of said secondary exhaust tracts being configured independently of an engine firing order, wherein said secondary exhaust tracts comprise at least one low-backpressure high-flow tract and at least one high-backpressure low-flow tract.

7. The exhaust manifold of claim 6, wherein said primary exhaust tract is connected to a corresponding exhaust port.

8. The exhaust manifold of claim 6, wherein said engine is an internal combustion engine.

9. The exhaust manifold of claim 6, wherein each of said plurality of secondary exhaust tracts comprise at least two secondary tracts.

10. The exhaust manifold of claim 6, further comprising a plurality of additional primary exhaust tracts.

11. The exhaust manifold of claim 7, wherein said primary exhaust tract divides into said plurality of secondary exhaust tracts downstream of said exhaust port.

12. The exhaust manifold of claim 6, wherein said low-backpressure high-flow tract defines a diameter which is larger than a diameter defined by said high-backpressure low-flow tract.

13. The exhaust manifold of claim 6, wherein said primary exhaust tract defines a cross-section which is generally tubular.

14. The exhaust manifold of claim 6, wherein each of said secondary exhaust tracts define a cross-section which is generally tubular.

15. The exhaust manifold of claim 13, wherein said cross-section is selected from the group consisting of circular, elliptical, and rectangular shapes.

16. The exhaust manifold of claim 14, wherein said cross-section is selected from the group consisting of circular, elliptical, and rectangular shapes.

17. The exhaust manifold of claim 6, wherein a total cross-sectional area defined by each of said secondary exhaust tracts is equal to or greater than a cross-sectional area defined by said primary exhaust tract.

* * * * *